W. H. HERDMAN.
MECHANICAL DRIVING CONNECTION.
APPLICATION FILED MAY 22, 1914.
1,163,920.
Patented Dec. 14, 1915.
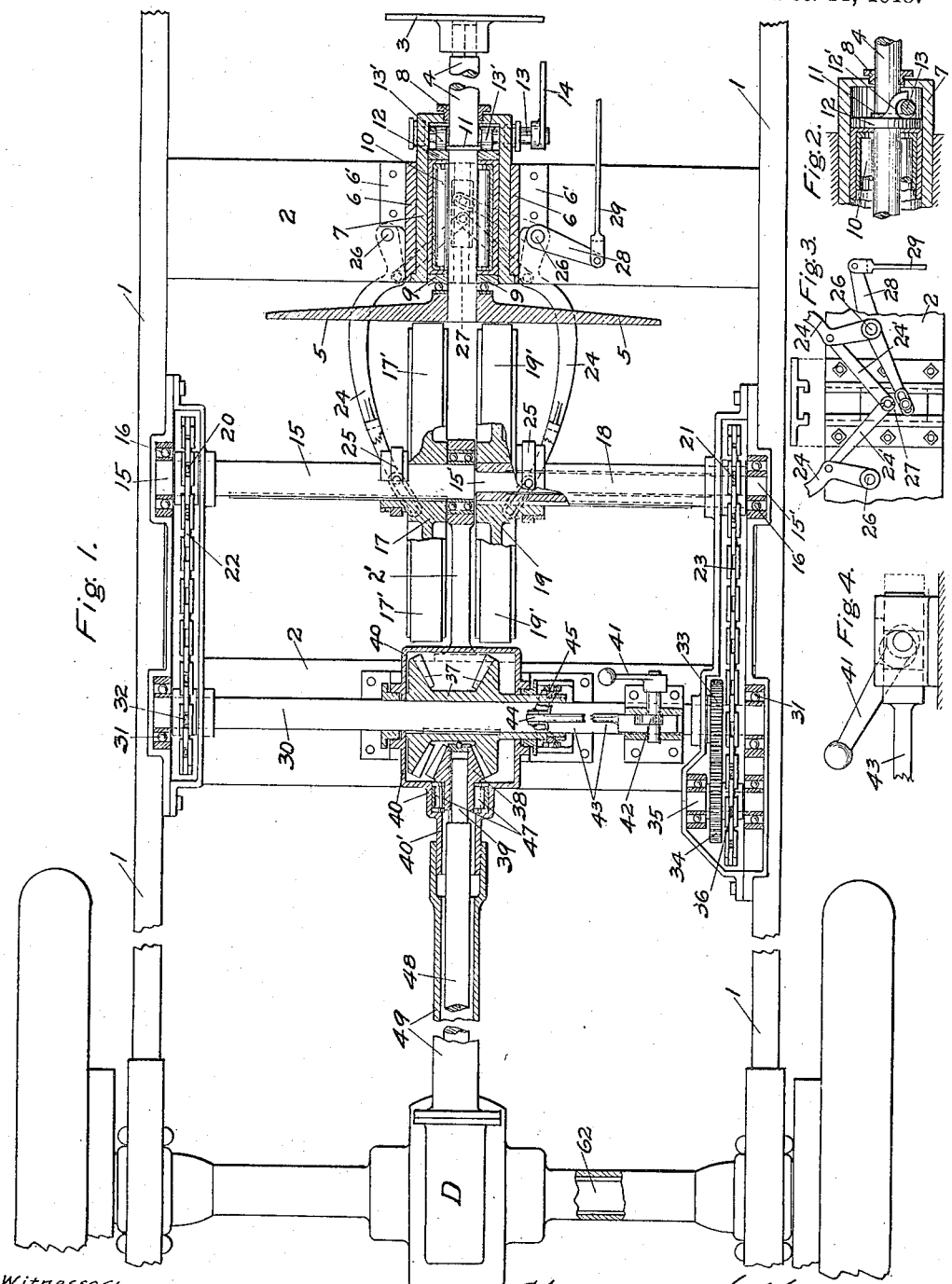

UNITED STATES PATENT OFFICE.

WILLIAM H. HERDMAN, OF PORTLAND, OREGON.

MECHANICAL DRIVING CONNECTION.

1,163,920.  Specification of Letters Patent.  Patented Dec. 14, 1915.

Application filed May 22, 1914. Serial No. 840,253.

*To all whom it may concern:*

Be it known that I, WILLIAM H. HERDMAN, a citizen of the United States, residing in the city of Portland, county of Multnomah and State of Oregon, have invented certain new and useful Improvements in Mechanical Driving Connections, of which the following is a specification.

My invention relates to mechanical driving connections, and more particularly to certain new and useful improvements in driving connections between power furnishing mechanism and a transmission mechanism, such, for example, as the driving connections between the engine and the running gear of automobiles, auto-trucks and the like, though the invention is adaptable for use as a driving connection between any driving and driven mechanisms.

Among the salient objects of my invention are,—to provide in a mechanism of the character referred to an improved friction drive between driving and driven elements, with any variable speed from one to the other; and, in general, to provide an improved driving connection from a power-furnishing mechanism to the driven elements, with variable speeds, without the use of interchangeable gears with teeth or cogs which must be moved into mesh with each other during movements relative to each other.

In order that others may fully understand my invention, I have illustrated one practical embodiment thereof on the accompanying sheets of drawings, and in which it is shown applied to an automobile or auto-truck mechanism.

In the drawings,—Figure 1 is a plan view, with parts in section, showing so much of a running-gear of a motor car as is necessary to illustrate my invention; Fig. 2 is a vertical sectional view, with parts in elevation, showing one means for moving shaft 4 and driving disk 5 longitudinally of their axis of rotation; Fig. 3 is a fragmentary bottom plan view showing the mechanism mounted on the under side of the cross member 2, and which mechanism is indicated in dotted lines in Fig. 1 above; Fig. 4 is a side elevation of a lever and connections for operating the reversing mechanism.

Referring now to Fig. 1, 1—1 designate two side members of a running gear frame, and 2—2 supporting cross members secured thereto.

3 designates a connecting flange member adapted to be connected directly to the engine or power-furnishing mechanism (not shown), and is also adapted to receive therein the end of a driving shaft 4, shown to be square at its end and having a sliding or telescoping connection with said flange member 3, for a purpose hereinafter again referred to. Mounted upon the opposite end of said driving shaft 4 is a driving friction disk 5.

I will now describe mechanism by means of which said driving shaft 4 and the friction disk can be moved slightly longitudinally of their axis of rotation. A suitable boxing 6, with flanges 6' is mounted upon the support 2, and within this box is secured a casing 7 with bearing bushing 8 at one end, and a ball bearing runway or thrust block 9 in its opposite end, with bearing balls between it and the driving disk 5, as indicated. A cage of roller bearings, as 10, is mounted within the casing 7, around the shaft 4, as indicated. Mounted upon the shaft 4, in the rear of said casing 7, is a collar 11, and within the casing is a sliding bearing block or plate 12. Mounted crosswise in said casing 7 is a cam shaft 13, having two eccentric cam portions 13'—13' in operating connection by means of hooks or horns 12' formed thereon, with said slide plate 12, whereby to move said plate and said shaft 4, when said cam shaft 13 is turned by means of a hand lever 14 attached thereto. Thus by the movement of the lever 14, said driving shaft 4 and the driving friction disk 5 can be moved slightly, longitudinally of said shaft, the end of the shaft 4 sliding within the flange member 3 without disturbing its driving connection therewith. Mounted across said running-gear frame is a shaft 15, one half of which is of reduced diameter, as shown at 15', and the opposite ends of which are supported in suitable anti-friction bearing boxes 16—16 on the members 1—1, substantially as indicated. Slidably mounted on said shaft 15, and keyed thereto, is a driving friction wheel 17, provided with a suitable friction tire 17' and adapted to bear against the driving disk 5, at right angles thereto, in the manner shown. Mounted upon the reduced portion of the shaft 15' is a sleeve 18, adapted to turn thereon, and having slidably mounted thereon and keyed thereto, a second friction wheel 19, provided with a friction tire 19', also adapted to bear against the driving disk 5, at the opposite side of the center thereof. On the outer ends of the shaft 15 and sleeve 18, and driven therewith, are two sprocket wheels 20 and 21 over which run the sprocket chains 22 and 23.

The friction wheels 17 and 19 are adapted to be moved simultaneously upon the shaft 15 and the sleeve 18, to which they are keyed, respectively, into different bearing positions against the disk 5, said wheels 17 and 19 being moved bodily laterally in opposite directions to and from the center of said disk 5 and toward and from each other on opposite sides of the center of said disk, in a manner now to be described.

Mounted on the under side of the cross member 2, Figs. 1 and 3, is a pair of spreading arms 24—24, connected at their outer ends, which are preferably made with two prongs each, to the wheels 17 and 19, as by means of collars 25—25, and having pin and slot connections with the prongs of said arms 24—24, whereby when said arms are moved apart or together said friction wheels 17 and 19 are moved therewith. Said spreading arms are pivoted to the under side of said cross member 2, as at 26—26, and are operated by means of toggle links 24'—24', pivotally connected thereto at their outer ends, and at their meeting ends said links are pivotally connected to an operating block 27, slidably mounted in a slideway on the under side of said cross member 2, as indicated in Fig. 3. Said slide block 27 is adapted to be moved by means of a lever 28, made in two parts, with one part above and one part below said support 2, and both parts secured to the pivot shaft 26, extending through the support 2. An operating rod 29 runs to an operating hand lever (not shown) in any desired location. Thus by operating the lever 28, said spreading arms 24—24, are operated to move said friction driving wheels 17 and 19 to and from each other, whereby to change their driving engagement with the driving friction disk 5, and thereby to change their speed.

Mounted across the running gear frame is a second shaft 30, with suitable anti-friction bearing boxes, as 31—31. This shaft is driven through the sprocket chains 22 and 23, and to this end is provided at one end with a sprocket wheel 32, having direct driving connection with the sprocket wheel 20, through the sprocket chain 22. At its opposite end said shaft 30 is provided with a gear 33, in mesh with a gear 34, mounted upon a short shaft 35, which shaft also carries a sprocket wheel 36, driven from sprocket wheel 21, by a sprocket chain 23. This connection is used for the reason that the friction drive wheel 19, its sleeve 18, and sprocket wheel 21, are all driven in the opposite direction to that of friction wheel 17, shaft 15 and sprocket wheel 20. Thus from the friction disk 5 I drive shaft 30 at both ends in the same direction. Slidably mounted upon said shaft 30 is a double beveled gear 37, keyed thereto so as to be driven therewith and at the same time to be moved to put its oppositely facing gear teeth alternately into mesh with the beveled gear 38, mounted on a shaft 39, in the boxing or casing 40, supported upon the cross member 2, at the rear of the running-gear frame, and within which casing is also mounted gear 37. As a means for moving said double gear 37, I provide a lever 41, operating an eccentric cam 42, connected with a rod 43, attached at its opposite end to a rocking arch member 44, operatively connected at its opposite sides with a sleeve portion of said double gear 37, as indicated at 45. Thus by operating the hand lever 41, the double gear 37 is moved upon the shaft 30 so that one or the other of its gear sets mesh with the beveled gear 38, or said double gear can be moved to a neutral position, out of driving engagement with said beveled gear 38, whereby to absolutely disconnect the drive from the rear axle of the vehicle.

The beveled gear 38 is provided with roller bearings, as at 47 within an extension 40' of the casing 40. Said stub shaft 38 has a sliding, driving connection with the shaft 48, extending to a differential driving mechanism, designated as a whole D, said shaft 48 being inclosed in a tubular casing 49, extending from the casing of a differential mechanism D, and having a telescoping engagement with the extension 40'.

An important feature of the invention not heretofore described is a supporting brace member 2' which has a bearing support for the friction wheels 17 and 19 therebetween and at its opposite end is anchored on the cross member 2. This provides a firm support for the friction wheels and their supporting members, and prevents any yielding movement thereof away from the driving disk under increased frictional contact between the disk and said friction wheels, as when under heavy load.

I am aware that changes can be made in the invention as here embodied for purposes of illustration without departing from the spirit thereof, and I do not, therefore, limit the invention to the particular forms here shown, except as I may be limited by the hereto appended claims.

I claim,—

1. In a mechanical driving mechanism, a friction driving disk, a shaft revolubly mounted in front of said disk, a sleeve revolubly mounted on said shaft and extending over only a part of its length, friction driving wheels mounted, respectively, on said shaft and said sleeve and having driving connections therewith and slidable thereon, said wheels standing at right angles to said driving disk and bearing thereagainst, and means for simultaneously sliding said friction wheels toward and from each other at opposite sides of the center of said friction disk, substantially as shown and described.

2. In a mechanical driving mechanism, a friction driving disk, a shaft revolubly mounted in front of said disk, a sleeve revolubly mounted on said shaft and extending over only a part of its length, a supporting member for said shaft and sleeve, having a ball bearing connection therewith, two friction driving wheels mounted, respectively, on said shaft and said sleeve and having driving connections therewith and slidable thereon, said wheels standing at right angles to said driving disk and bearing thereagainst, means for simultaneously sliding said friction wheels toward and from each other at opposite sides of said supporting member, and driving means mounted upon said shaft and said sleeve, substantially as described.

3. In a mechanical driving mechanism, in combination, a friction driving disk, a shaft therefor, supporting, anti-friction bearing means for said shaft, anti-friction bearings between said driving disk and said supporting, anti-friction bearing means, adapted to take the thrust of said disk, means for moving and holding said shaft and said friction driving disk in opposite directions longitudinally of said shaft, a shaft mounted transversely in front of said disk, a sleeve member mounted upon said shaft, a supporting member for said shaft and sleeve connected thereto near the end of said sleeve, two driving wheels having driving connections, respectively, with said shaft and said sleeve member and slidable thereon in opposite directions, and means for simultaneously sliding said driving wheels toward and from the center of said friction driving disk, substantially as described.

4. In a driving mechanism of the character referred to, in combination, a driving friction disk, means for moving and holding the same in different positions of adjustment longitudinally of its axis of rotation, a supporting shaft in front of said disk, a sleeve member carried by said shaft, two friction wheels mounted, respectively, on said shaft and said sleeve member and bearing against said disk, means for moving said friction wheels toward and from each other at opposite sides of the center of said driving disk, and a bearing support for said shaft and sleeve member between said friction wheels.

Signed at Portland, Multnomah county, Oregon, this 16th day of May, 1914.

WILLIAM H. HERDMAN.

In presence of—
R. B. FRENCH,
H. C. ALLEN.

Copies of this patent may be obtained for five cents each, by addressing the "Commissioner of Patents, Washington, D. C."